US012753649B2

(12) United States Patent
Kunst

(10) Patent No.: US 12,753,649 B2
(45) Date of Patent: Oct. 6, 2026

(54) METHOD AND DEVICE FOR CONTROLLING MOVEMENTS OF AT LEAST ONE MOTOR VEHICLE DOOR OF A PARKED MOTOR VEHICLE

(71) Applicant: KIEKERT AKTIENGESELLSCHAFT, Heiligenhaus (DE)

(72) Inventor: Frank Kunst, Lüdinghausen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 77 days.

(21) Appl. No.: 18/699,612

(22) PCT Filed: Sep. 28, 2022

(86) PCT No.: PCT/DE2022/100720
§ 371 (c)(1),
(2) Date: Apr. 9, 2024

(87) PCT Pub. No.: WO2023/061528
PCT Pub. Date: Apr. 20, 2023

(65) Prior Publication Data

US 2024/0401393 A1 Dec. 5, 2024

(30) Foreign Application Priority Data

Oct. 13, 2021 (DE) ..................... 10 2021 126 465.0

(51) Int. Cl.
*E05F 15/71* (2015.01)
*E05B 77/54* (2014.01)
(Continued)

(52) U.S. Cl.
CPC .............. *E05F 15/71* (2015.01); *E05B 77/54* (2013.01); *E05B 81/04* (2013.01); *E05B 81/56* (2013.01);
(Continued)

(58) Field of Classification Search
CPC .......... E05F 15/71; E05F 15/73; E05B 77/54; E05B 81/04; E05B 81/56; E05Y 2400/44; E05Y 2400/528; E05Y 2900/531
See application file for complete search history.

(56) References Cited

U.S. PATENT DOCUMENTS 6,388,410 B1 * 5/2002 Hohn .................. B60R 25/1001 318/449
9,384,647 B1 * 7/2016 Arnold ..................... G01K 1/14
(Continued)

FOREIGN PATENT DOCUMENTS

DE 102009061016 B4 12/2011
DE 102019115304 A1 9/2020
(Continued)

OTHER PUBLICATIONS

English Translation of KR-20220161635-A, Lee, Joongkyu (Year: 2022).*
(Continued)

*Primary Examiner* — Kito R Robinson
*Assistant Examiner* — Kevin Jerome Harvey, II
(74) *Attorney, Agent, or Firm* — Renner, Otto, Boisselle & Sklar, LLP

(57) ABSTRACT

A method for controlling movements of at least one motor vehicle door of a parked motor vehicle. First, the presence of at least one living being inside the motor vehicle is determined using at least one sensor. Then, an increase in temperature inside the motor vehicle is detected using a further second sensor. A control unit evaluates the above-
(Continued)

mentioned sensor signals so that an actuator opens the motor vehicle door. According to the invention, an opening device for the motor vehicle door is used as the actuator.

9 Claims, 2 Drawing Sheets

(51) Int. Cl.

| | |
|---|---|
| ***E05B 81/04*** | (2014.01) |
| ***E05B 81/56*** | (2014.01) |
| ***E05F 15/73*** | (2015.01) |

(52) U.S. Cl.

CPC ........... *E05F 15/73* (2015.01); *E05Y 2400/44* (2013.01); *E05Y 2400/528* (2024.05); *E05Y 2900/531* (2013.01)

(56) References Cited

U.S. PATENT DOCUMENTS

| | | | | |
|---|---|---|---|---|
| 9,919,646 | B1 | 3/2018 | Bettye | |
| 11,040,593 | B1 | 6/2021 | Chen | |
| 2017/0247933 | A1 * | 8/2017 | Elie | G01K 3/005 |
| 2020/0071967 | A1 * | 3/2020 | Adams | G07C 9/00174 |

FOREIGN PATENT DOCUMENTS

| | | | | |
|---|---|---|---|---|
| DE | 102019121650 | A1 | 12/2020 | |
| DE | 102019126590 | A1 | 4/2021 | |
| KR | 20220161635 | A * | 12/2022 | E05F 15/73 |

OTHER PUBLICATIONS

International Search Report mailed Jan. 2, 2023, for priority International Application No. PCT/DE2022/100720.

* cited by examiner

METHOD AND DEVICE FOR CONTROLLING MOVEMENTS OF AT LEAST ONE MOTOR VEHICLE DOOR OF A PARKED MOTOR VEHICLE

This application is a national phase of International Patent Application No. PCT/DE2022/100720 filed Sep. 28, 2022, which claims priority to German Patent Application No. 10 2021 126 465.0 filed Oct. 13, 2021, each of which is hereby incorporated herein by reference in its entirety.

FIELD OF DISCLOSURE

The invention relates to a method and a device for controlling movements of at least one motor vehicle door of a parked motor vehicle according to the preamble of either claim 1 or claim 8.

BACKGROUND OF DISCLOSURE

When motor vehicles are parked, there is a risk that living beings, in particular children or pets, are or may be inside. This is the case, for example, if an infant or a pet has fallen asleep after a journey in a motor vehicle and is left inside at least until a front door or garage has been opened. Comparable situations can arise when the motor vehicle is parked in order to refuel it, charge it with electrical energy, top up the coolant, inflate the tires, fill up a windshield washer, clean the windshield, etc. In such a case, for example, at high temperatures there is a risk of the living being overheating and even of damage to their health. This applies in particular when the motor vehicle is locked, which often happens automatically after a certain period of time while driving or even when stationary.

To this end, the generic prior art according to DE 10 2009 061 016 B4 proposes that not only the presence of the living being in question inside the motor vehicle is detected but rather, in response to a possible increase in interior temperature, the option of opening a sunroof or another hatch or flap of the vehicle is addressed. This allows hot air that has built up in the vehicle to escape. This is particularly advantageous if the vehicle or motor vehicle is parked in blazing sunlight, for example, and the temperature inside the motor vehicle exceeds a critical value for the well-being or health of the living being.

The further prior art according to DE 10 2019 121 650 A1 relates to a method for controlling door movements of at least one controllable door of a motor vehicle. At least one control device and at least one sensor arrangement is assigned to the door in question.

The prior art has proven itself in principle, but still offers room for improvement. The generic teaching according to DE 10 2009 061 016 B4 ultimately leaves open the details of how the motor vehicle door should be opened. The fundamental problem here is that the motor vehicle door in question is locked or an opening drive is generally missing. This is where the invention steps in.

SUMMARY OF DISCLOSURE

The invention is based on the technical object of further developing such a method and an associated device for controlling movements of at least one motor vehicle door of a parked motor vehicle in such a way that danger to living beings inside is avoided in every case and in a simple manner.

In order to achieve this technical object, the invention proposes in a generic method that an opening device for the motor vehicle door is used as the actuator for actuating the motor vehicle door.

The invention is based first of all on the knowledge that any high temperatures arising in the interior of a motor vehicle can be controlled particularly easily and effectively and ventilation can be provided if the actuator, which is actuated by the control unit and opens the motor vehicle door, is configured as an opening device for the motor vehicle door in question. In fact, such opening devices are increasingly being used in practice and generally ensure that the motor vehicle door is opened at least as far as a pre-opening position or beyond the pre-opening position.

In this way, the motor vehicle door in question can then be opened fully and manually by an operator gripping the door leaf of the motor vehicle door through the gap formed and swinging the motor vehicle door completely open. This means that there is often no need for any external door handles on such motor vehicle doors, which is advantageous in terms of an aerodynamically favorable design. For this reason, such opening devices are increasingly being used in modern motor vehicles.

In addition, it has proven particularly useful in this context if the opening device in question is at least partially integrated into a motor vehicle lock of the motor vehicle door. In other words, the opening device is advantageously a component of a motor vehicle lock belonging to the motor vehicle door in question. As a result of this and when the motor vehicle lock in question is installed in or on the associated motor vehicle door, the opening function can be easily realized and implemented. As a result, the motor vehicle door in question is opened at least to form a gap so that the interior of the motor vehicle is ventilated through the door seal.

The invention is further based on the knowledge that the motor vehicle lock in question and equipped with the opening device is advantageously configured as an electric lock. Such a motor vehicle lock has an electric motor drive which can be used to open a locking mechanism. This allows the motor vehicle door to be opened when the locking mechanism is open.

As a result of this, within the scope of the invention, the motor vehicle is forcibly ventilated in the event of a significant increase in the temperature inside the motor vehicle, so that any danger to living beings inside the motor vehicle can be excluded. This is complemented by the fact that, in an advantageous embodiment, the control unit actuates the opening devices of all or selected vehicle doors of the motor vehicle. These motor vehicle doors can be motor vehicle side doors as well as a motor vehicle tailgate, motor vehicle sliding doors, etc.

If the motor vehicle door in question to be opened according to the invention is locked when the motor vehicle is parked, the control unit advantageously ensures that the associated motor vehicle lock is unlocked and/or opened before the opening device is actuated. For this purpose, the corresponding electric motor drive present inside the associated motor vehicle lock may be actuated by the control unit in such a way that an actuating lever chain as component of the motor vehicle lock is unlocked with its aid. As a result, the opening device or the drive can then ensure the desired opening process. As a rule, the locking mechanism consisting of a rotary latch and pawl located inside the motor vehicle lock is opened at the same time.

The control unit generally operates in such a way that the increase in temperature inside the motor vehicle is detected over time using the second sensor. A gradient can be determined from the increase in temperature over time inside the motor vehicle. The control unit generally proceeds in such a way that the opening device in question is only actuated when a certain preset gradient is exceeded. Alternatively or additionally, the control unit can also monitor whether measured values from the second sensor used at this point to detect the increase in temperature inside the motor vehicle have generally exceeded a predetermined temperature threshold value. In most cases, the design is such that the control unit actuates the opening device when one of the two criteria (exceeding a specific gradient or a predetermined threshold value) is met. This makes it possible to effectively prevent health risks to living beings inside the motor vehicle.

The presence of the living being in question is determined using at least a first sensor. This first sensor is generally what is referred to as a seat occupancy sensor. The second sensor for detecting the temperature inside the motor vehicle is designed as an interior temperature sensor.

Both the seat occupancy sensor and the interior temperature sensor are mandatory in modern motor vehicles. The seat occupancy sensor is used to control the possible activation of airbags. The interior temperature sensor, on the other hand, is generally required to precisely activate and control an air conditioning system, which is also usually mandatory.

The invention therefore uses existing sensors and processes their signals with the aid of the control unit, which in turn actuates the opening device for the motor vehicle door in question. It is of course within the scope of the invention to open only the motor vehicle door adjacent to the living being in question. This can be done in a first step, for example. If the temperature inside the vehicle does not fall significantly as a result of this, the other vehicle doors can also be opened with the aid of the associated opening device.

The health of any living beings remaining inside the motor vehicle and of children in particular is optimally protected because overheating of the interior is effectively countered. This is achieved with the aid of the associated opening device on the vehicle door, which in this context provides forced ventilation. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
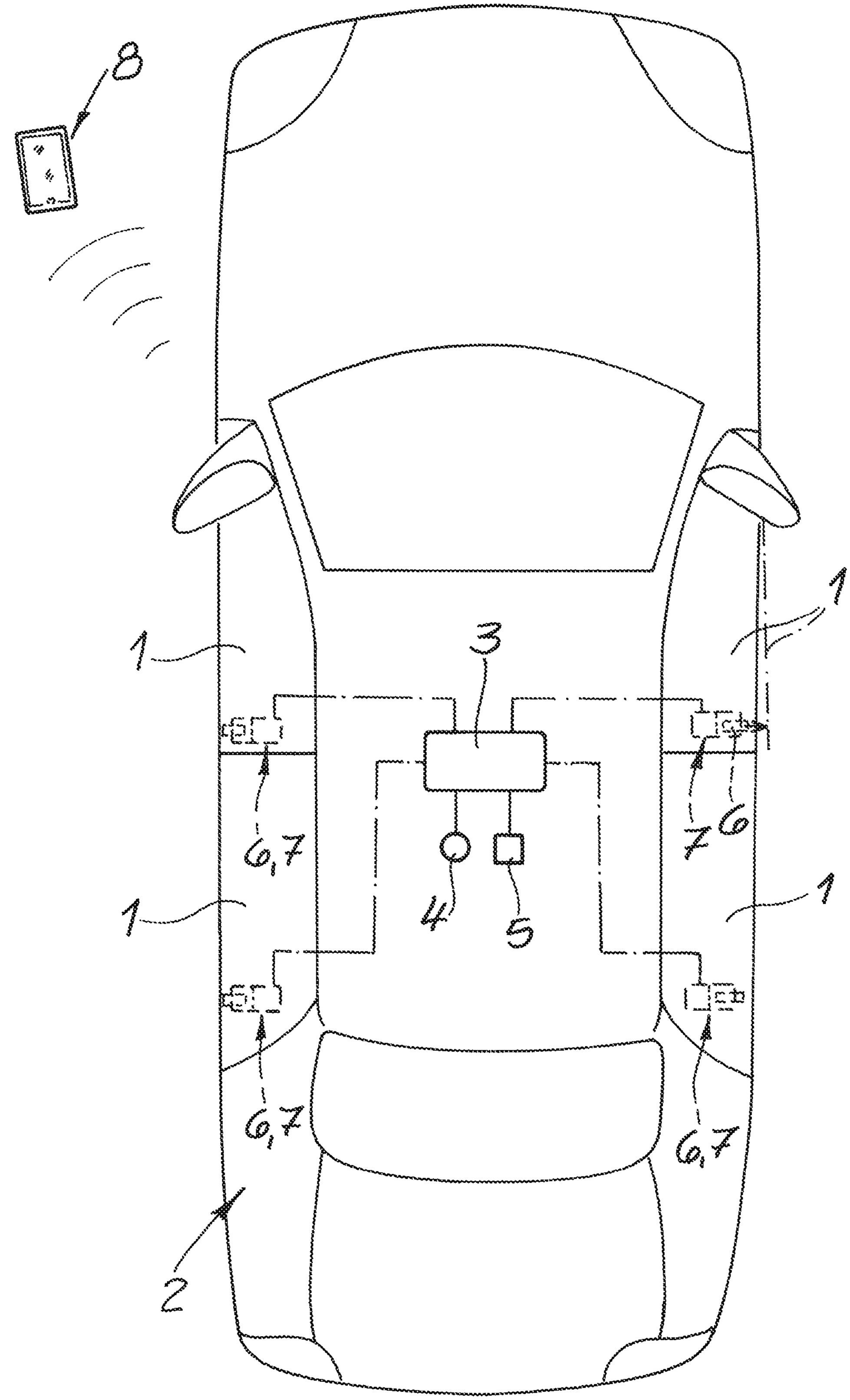
FIG. 1 schematically shows a parked motor vehicle.

The figures show a device for controlling movements of at least one motor vehicle door 1. In the example case, the motor vehicle door 1 is a motor vehicle side door of a schematically shown motor vehicle 2. The motor vehicle 2 is parked. Corresponding to this, a mandatory control unit 3 evaluates, for example, the signal from an ignition lock and/or speed signals from the motor vehicle 2.

In addition, at least one first sensor 4 is implemented, which can be used to determine the presence of at least one living being inside the motor vehicle 2. In fact, the first sensor 4 is a seat occupancy sensor 4, which determines in the usual way whether a person is sitting on a seat or not. Instead of the seat occupancy sensor, however, the first sensor 4 can also be configured and operate in such a way that it can be used to determine the presence of a living being in a different way, for example a dog in the trunk. For this purpose, it is conceivable that the first sensor 4 is configured as an infrared sensor which reacts to the thermal radiation emitted by the living being in question. A camera or sensors that operate in a different way are also conceivable in this context.

In addition to the first sensor 4, a second sensor 5 is provided. The second sensor 5 is used to detect an increase in temperature inside the vehicle 2. For this purpose, the second sensor 5 according to the exemplary embodiment is an interior temperature sensor 5. Both sensors 4, 5 are connected to the control unit 3 to evaluate their signals.

After evaluating the sensor signals from the first sensor 4 and the second sensor 5, the control unit 3 now ensures that an actuator 6 opens the associated motor vehicle door 1, forming a gap at least wide enough to allow the interior of the motor vehicle 2 to be ventilated. For this purpose, the actuator 6 according to the exemplary embodiment is an opening device 6 for the motor vehicle door 1.

Figure 2:
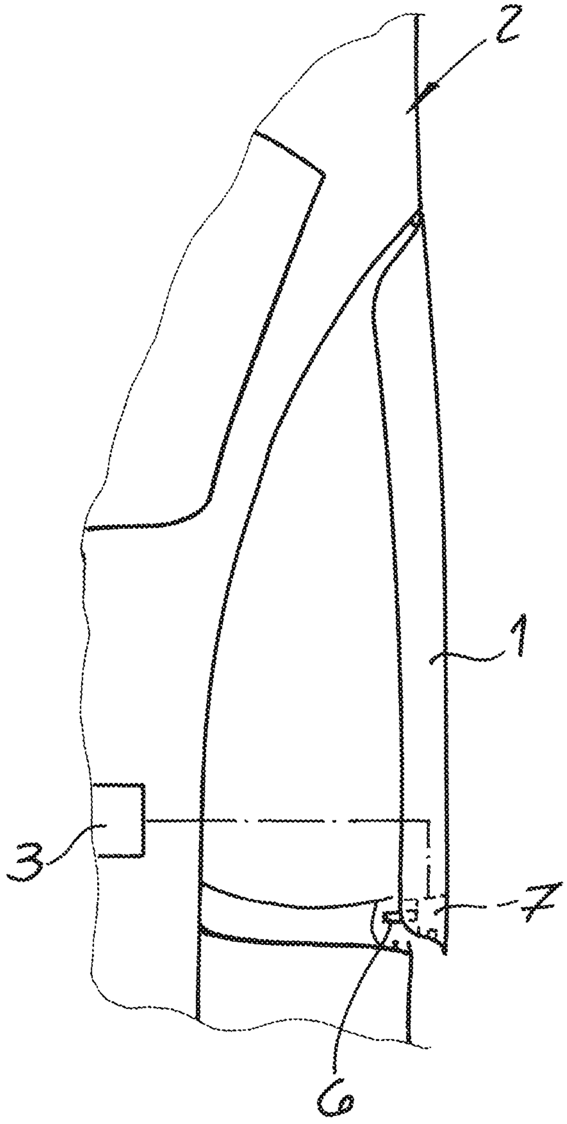
FIG. 2 shows the opening process of the associated motor vehicle door.

The enlarged illustration in FIG. 2 shows that the opening device 6 opens the vehicle door 1 at least to a pre-opening position or even beyond. For this purpose, the opening device 6 is at least partially integrated into a motor vehicle lock 7 in or on the motor vehicle door 1. The motor vehicle lock 7 has a locking mechanism consisting of a rotary latch and pawl, which is not expressly shown, and also has an actuating lever chain located inside. In addition, an electric motor drive is implemented and provided inside the motor vehicle lock 7.

The control unit 3 can be used not only to actuate the opening device 6 of the motor vehicle door 1 in question, but also to actuate selected or all motor vehicle doors 1 of the motor vehicle 2. For example, it is conceivable that when a certain predetermined temperature inside the motor vehicle 2 is exceeded, the motor vehicle door 1 adjacent to the living being in question or the first sensor 4 is first opened. If the temperature inside the motor vehicle 2 does not fall significantly following this forced ventilation of the motor vehicle door 1 in question, the control unit 3 also controls the remaining opening devices 6 of the remaining motor vehicle doors 1 accordingly in the sense that the associated motor vehicle doors 1 are each opened to form a gap, thus providing additional forced ventilation of the interior of the motor vehicle 2. Of course, it is also possible to proceed from the outset in such a way that the control unit 3 actuates all motor vehicle doors 1 of the motor vehicle 2.

In order to ensure that the motor vehicle door 1 is actually opened when the control unit 3 actuates the motor vehicle lock 7 or the motor vehicle door 1 in question, the control unit 3 generally ensures that the motor vehicle lock 7 in question is unlocked and/or opened before actuating the opening device 6 of the associated motor vehicle lock 7. This corresponds to the fact that the control unit 3 is used to transfer the actuating lever chain previously mentioned and located inside the motor vehicle lock 7 to its "unlocked" state. As a result, the associated motor vehicle door 1 can be opened to form a gap using the opening device 6. For this purpose, the opening device 6 may operate in addition to the locking mechanism as a component of the motor vehicle lock 7 in such a way that the locking mechanism is opened. Alternatively, the electric motor drive can also open the locking mechanism beforehand.

When evaluating the two sensors 4, 5, the control unit 3 can proceed in such a way that, for example, the second sensor 5 is used to detect the increase in temperature inside the motor vehicle 2 over time and determine gradients. The design is such that the opening device 6 is only actuated when a certain preset gradient is exceeded. The control unit 3 can also be used to evaluate whether the temperature inside the motor vehicle 2 measured by the second sensor 5 exceeds a predetermined threshold value. As a rule, the design is such that the fulfillment of one of the two possibilities specified above corresponds to the actuation of the opening device 6.

In addition, it is provided that the control unit 3 also emits a warning signal when the opening device 6 is activated. This warning signal can, for example, be designed in such a way that the already existing and mandatory hazard warning light system of the motor vehicle 2 is activated. However, it is also possible for the control unit 3 to send a message to a vehicle user in this case. The invention is based on the knowledge that nowadays, modern motor vehicles are typically set up and operate in such a way that the control unit 3 communicates with, for example, a cell phone 8 of the motor vehicle user, which is only indicated in the figures, and in this context emits the warning signal referred to.

The control unit 3 can, of course, also be set up so that after the temperature inside the motor vehicle 2 falls, the actuator 6 of the motor vehicle door 1 that is slightly ajar or the actuators 6 of a plurality of vehicle doors 1 that are slightly ajar are controlled to close the motor vehicle doors 1 again.

LIST OF REFERENCE NUMBERS

Motor vehicle door 1
Motor vehicle 2
Control unit 3
Sensor 4
Sensor 5
Actuator, opening device 6
Motor vehicle lock 7
Cell phone 8

The invention claimed is:

1. A method for controlling movements of at least one motor vehicle door of a parked motor vehicle, comprising the steps of:

determining a presence of at least one living being inside the motor vehicle using at least a first sensor;

detecting an increase in temperature inside the motor vehicle using a second sensor; and evaluating with a control unit sensor signals from the first sensor and the second sensor and actuating, an actuator to open the motor vehicle door based on the evaluating by the control unit;

wherein the actuator comprises an opening device that opens the motor vehicle door when actuated by the control unit to a pre-opening position to ventilate an interior of the motor vehicle, wherein the second sensor is an interior temperature sensor that detects temperature in the interior of the motor vehicle, and after actuating the opening device to open the motor vehicle door and then detecting that the temperature falls with the second sensor the control unit controls the opening device to close the motor vehicle door.

2. The method in accordance with claim 1, wherein the opening device is at least partially integrated into a motor vehicle lock of the motor vehicle door.

3. The method in accordance with claim 1, wherein the motor vehicle includes a plurality of motor vehicle doors each having a respective opening device, and the control unit actuates the respective opening device of all or a selected number of the plurality of motor vehicle doors of the motor vehicle, the selected number including more than one of the plurality of motor vehicle doors.

4. The method in accordance with claim 1, wherein the control unit unlocks and/or opens a motor vehicle lock of the motor vehicle door before the opening device is actuated to open the motor vehicle door.

5. The method in accordance with claim 1, wherein the control unit detects the increase in temperature inside the motor vehicle over time with the second sensor and determines a temperature gradient, the opening device only being actuated when a certain preset gradient and/or a predetermined threshold value of the temperature is exceeded.

6. The method in accordance with claim 1, wherein the control unit additionally emits a warning signal when the opening device is actuated.

7. The method in accordance with claim 2, wherein the motor vehicle lock is an electric lock that includes an electric motor drive that operates a locking mechanism of the motor vehicle lock.

8. The method in accordance with claim 1, wherein the control unit operates the opening device of a motor vehicle door located adjacent to the living being whose presence is determined by the first sensor.

9. The method in accordance with claim 1, wherein the control unit determines whether the motor vehicle is parked based on an ignition lock signal and/or a speed signal of the motor vehicle.

* * * * *